United States Patent [19]
Horiba et al.

[11] Patent Number: 6,084,981
[45] Date of Patent: *Jul. 4, 2000

[54] IMAGE PROCESSING APPARATUS FOR PERFORMING IMAGE CONVERTING PROCESS BY NEURAL NETWORK

[75] Inventors: Isao Horiba, Kariya; Kenji Suzuki; Tatsuya Hayashi, both of Kashiwa, all of Japan

[73] Assignee: Hitachi Medical Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/617,031

[22] Filed: Mar. 18, 1996

[51] Int. Cl.$^7$ .................................................. G06K 9/62
[52] U.S. Cl. ............................ 382/157; 382/158; 706/20
[58] Field of Search ....................... 382/156, 157, 382/158, 159, 254, 255; 395/22, 23, 24; 706/20, 25, 31

[56] References Cited

U.S. PATENT DOCUMENTS

| | | |
|---|---|---|
| 4,249,207 | 2/1981 | Harman et al. ........................ 348/152 |
| 5,091,965 | 2/1992 | Kobayashi et al. ........................ 382/15 |
| 5,113,484 | 5/1992 | Jeong ........................................ 395/24 |
| 5,161,014 | 11/1992 | Pearson et al. .......................... 358/160 |
| 5,253,329 | 10/1993 | Villarrenl et al. ........................ 395/24 |
| 5,313,558 | 5/1994 | Adams ...................................... 395/22 |
| 5,323,471 | 6/1994 | Hayashi .................................. 382/158 |
| 5,493,688 | 2/1996 | Weingard ................................ 382/157 |

OTHER PUBLICATIONS

Design of Layered—Neural Nonlinear Fitters Using Back-Propugation Algorithm, Arakawa et al 1991 p. 421–429.

Primary Examiner—Bhavesh Mehta
Attorney, Agent, or Firm—Amtonelli, Terry, Stout & Kraus, LLP

[57] ABSTRACT

An image processing apparatus using a neural network having: an image supplying unit for supplying spatiotemporal data of a predetermined region including a target pixel of an image; and a neural network formed by coupling a plurality of artificial neuron models so as to have at least an input layer, a hidden layer, and an output layer, wherein in the output layer, an input/output converting process is executed by a linear function and data corresponding to a target pixel is outputted from the output layer.

21 Claims, 9 Drawing Sheets

IMAGE PROCESSING APPARATUS FOR PERFORMING IMAGE CONVERTING PROCESS BY NEURAL NETWORK

BACKGROUND OF THE INVENTION

The invention relates to various image processing apparatuses such as image diagnosing apparatus for a medical use, video processing apparatus for a broadcasting use, image processing apparatus for an industrial use, image photographing display apparatus for a commercial use, and the like, in which an information carrier such as electromagnetic wave including a light, X-rays, or the like, ultrasonic wave, or the like is irradiated or inputted to an object and a change in information carrier is measured, thereby obtaining image information. More particularly, the invention relates to an image processing apparatus in which peculiar noise or character which an apparatus system has with respect to the image information obtained as mentioned above is eliminated, the noise are reduced without being accompanied with a blur due to a motion, or an image is converted into an image that is preferably matched with a taste of the user, so that an accurate image with a large transfer information amount can be provided.

In a conventional image processing apparatus, in case of eliminating peculiar noise or character which the apparatus system has, the noise or character that is peculiar to the system is first modeled, and the noise or character is eliminated on the basis of the model. For example, when explaining with respect to the case of an X-ray photographing apparatus, there are noise and a spatial blur as factors which cause a deterioration in picture quality of an X-ray image that is obtained by the X-ray photographing apparatus. As noise which are mixed into the X-ray image, there are X-ray quantum noise based on the generation and annihilation stage of an X-ray photon. Those noise can be modeled by white Gaussian random noise. The X-ray photographing apparatus is handled as a linear system, a blur function is obtained from its impulse response, and the blur is approximated by a Gaussian function or the like, thereby modeling.

The prior arts regarding the present invention are shown below.

(1) An example in which a neural network is used to eliminate Gaussian random noise mixed into a 2-dimensional image has been reported. [Kaoru Arakawa and Hiroshi Harashima, "Designing of Layered-Neural Nonlinear Filters using Back Propagation Algorithm", the papers of The Institute of Electronics Information and Communication Engineers of Japan, Vol. J74-A, No. 3, pages 421–429, 1991]. According to the above paper, an ε filter is realized by a neural network.

(2) An example in which a binarization of a 2-dimensional image is realized by a neural network has been reported. [U.S. Pat. No. 5,091,965 (1992)]

(3) An example in which a rank filter is realized by a neural network has been reported. [U.S. Pat. No. 5,113,484 (1992)]

(4) An example in which a neural network is used as a defect corrector of a video signal has been reported. [U.S. Pat. No. 5,161,014 (1992)] According to the above paper, a defect correction filter is realized by a neural network.

In case of eliminating the peculiar noise or character which the system has and extracting meaning information, in an actual image processing system, a possibility such that the peculiar noise or character which the system has a mere spatial extent is very small, and in many cases, such noise or character has a time-dependent and spatial extent. It is extremely difficult to distinguish such peculiar noise or character from the meaning information from only information merely having a spatial extent. It is necessary to integrally judge from information having a time-dependent and spatial extent. In case of the above conventional apparatus, however, since they are judged from only the information having a spatial extent, the noise or character is not sufficiently eliminated. In case of reducing the noise without being accompanied with a blur due to a motion as well, even in case of distinguishing an object which time-spatially moves from the noise, they are judged from only the information having a spatial extent, so that the noise or character cannot be sufficiently eliminated.

In case of providing an image which is preferably matched with a taste of the user, since the above conventional apparatus doesn't have a function such that an image or information that is provided by the user or the like is given at the present location, an image which is preferably matched with a taste of the user cannot be provided.

SUMMARY OF THE INVENTION

It is, therefore, an object of the invention to provide an image processing apparatus which can cope with such problems and in which with respect to image information obtained by irradiating or inputting an information carrier to an object, peculiar noise or character which the apparatus system has is eliminated, the noise are reduced without being accompanied with a blur due to a motion, or an image is converted into an image that is preferably matched with a taste of the user, so that an accurate image with a large transfer information amount can be provided.

To accomplish the above object, according to the present invention, there is provided an image processing apparatus comprising: an original image supplying unit for outputting image data of a processing target; an image conversion processing unit for inputting the image data from the original image supplying unit and performing an image converting process; and a display unit for inputting and displaying the image information which was subjected to the image converting process by the image conversion processing unit and was outputted, wherein the image conversion processing unit is constructed by a neural network formed in a manner such that a network is constructed by coupling artificial neuron models so as to have a layer structure of an input layer, a hidden layer, and an output layer and spatiotemporal data of a predetermined region including at least a target pixel is inputted from the original image supplying unit and the image converting process is executed and data corresponding to the target pixel is outputted.

The neural network mentioned above can also output image information by dense/light analog values by using a linear function as an input/output function of the output layer at the final stage of the network coupled so as to have a layer structure.

Further, the above neural network can be also constructed in a manner such that a non-linear function, for example, a sigmoidal function partially having a region that can be linearly approximated is used as an input/output function of an output layer at the final stage of the network connected so as to have a layer structure, its non-saturation region is limited to a range of output image information, and the image information can be outputted by dense/light analog values.

Furthermore, as image data which is inputted to the neural network, the number of pixels is increased as a pixel position is time-spatially away from the target pixel and is averaged and the input information to the neural network can be also compressed.

A teach image supplying unit for inputting a teach signal for allowing the neural network to perform a learning operation can be also connected to the neural network.

As mentioned above, the image processing apparatus of the invention has the learning function for the neural network such that the information having a time-dependent and spatial extent is inputted and a response function of the output layer of the neural network is set to a linear function and, further, a response function of the output layer is set to a linear function. Therefore, with respect to the image information obtained, by eliminating the peculiar noise or character which the apparatus system has or reducing the noise without being accompanied with a blur due to the motion or converting an image into an image that is preferably matched with a taste of the user, an accurate image having a large transfer information amount can be provided.

DESCRIPTION OF THE PREFERRED EMBODIMENTS

Embodiments of the invention will now be described in detail hereinbelow with reference to the drawings.

Figure 1:
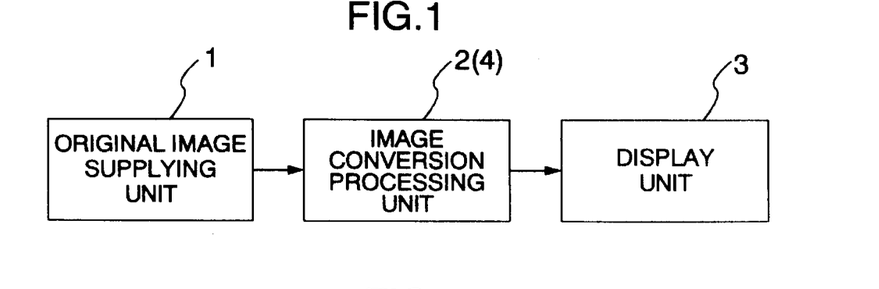
FIG. 1 is a block constructional diagram of an image processing apparatus of the invention.

FIG. 1 is a block diagram showing an embodiment of an image processing apparatus according to the invention. According to the image processing apparatus, an information carrier such as electromagnetic wave including a light, X-rays, or the like, ultrasonic wave, or the like is irradiated or inputted to an object and a change in information carrier is measured, thereby obtaining image information. For example, as an image processing apparatus, there are various kinds of apparatuses such as image diagnosing apparatus for a medical use, video processing apparatus for a broadcasting use, image processing apparatus for an industrial use, image photographing displaying apparatus for a commercial use, and the like. As shown in FIG. 1, the image processing apparatus has an original image supplying unit 1, an image conversion processing unit 2, and a display unit 3.

The original image supplying unit 1 outputs image data of a processing target and is, for example, a measuring unit for measuring or photographing an object in an image diagnosing apparatus for a medical use such as X-ray photographing apparatus, ultrasonic tomographing apparatus, X-ray CT apparatus, nuclear medicine imaging apparatus, magnetic resonance imaging apparatus, etc., a video processing apparatus for a broadcasting use, an image processing apparatus for an industrial use, an image photographing displaying apparatus for a commercial use, or the like, or is a storing unit in which the image data measured with respect to an object is stored and from which the image data is read out as necessary, or the like. The image conversion processing unit 2 receives the image data outputted from the original image supplying unit 1 and executes a desired image converting process and is constructed by, for example, filter means. Further, the display unit 3 receives the image information which was image conversion processed and outputted from the image conversion processing unit 2 and displays and is constructed by, for example, a television monitor.

Figure 2:
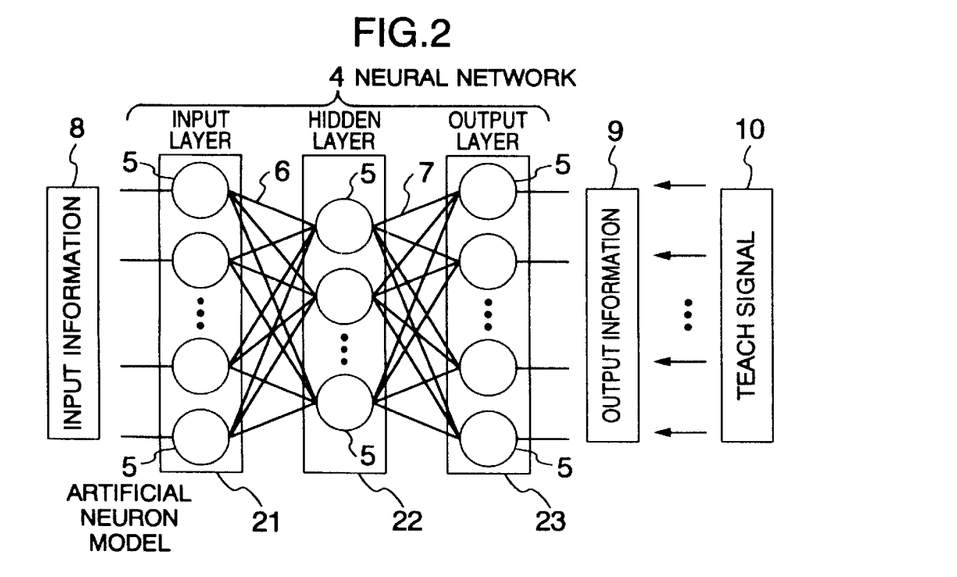
FIG. 2 is a detailed diagram of an image conversion processing unit of the invention.

In the invention, the image conversion processing unit 2 is constructed by a neural network 4 as shown in FIG. 2. The neural network 4 receives the spatiotemporal data of a predetermined region including at least a target pixel from the original image supplying unit 1 and executes an image converting process and outputs the data corresponding to the target pixel. The neural network 4 constructs a network by coupling artificial neuron models 5 so as to have a layer structure of an input layer 21, a hidden layer 22, and an output layer 23 and is constructed by using a linear function as an input/output function of the output layer at the final stage.

Figure 3:
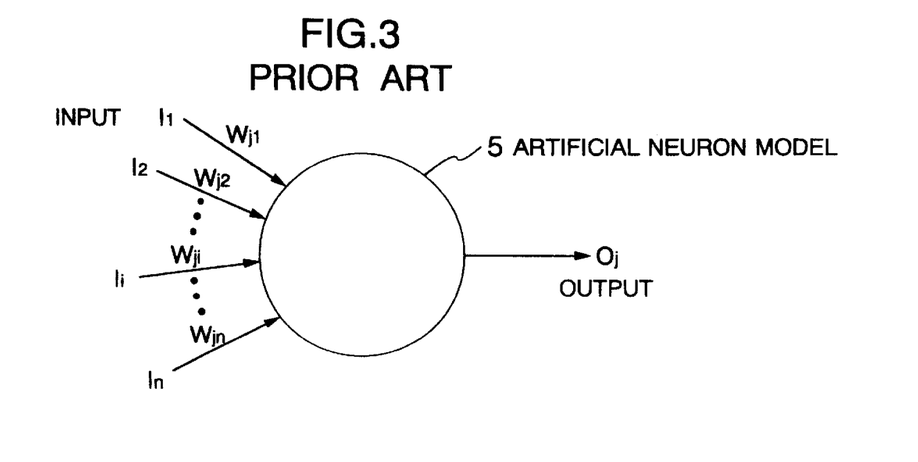
FIG. 3 is a diagram for explaining the operation of an artificial neuron model which is used for the image conversion processing unit.
Figure 4:
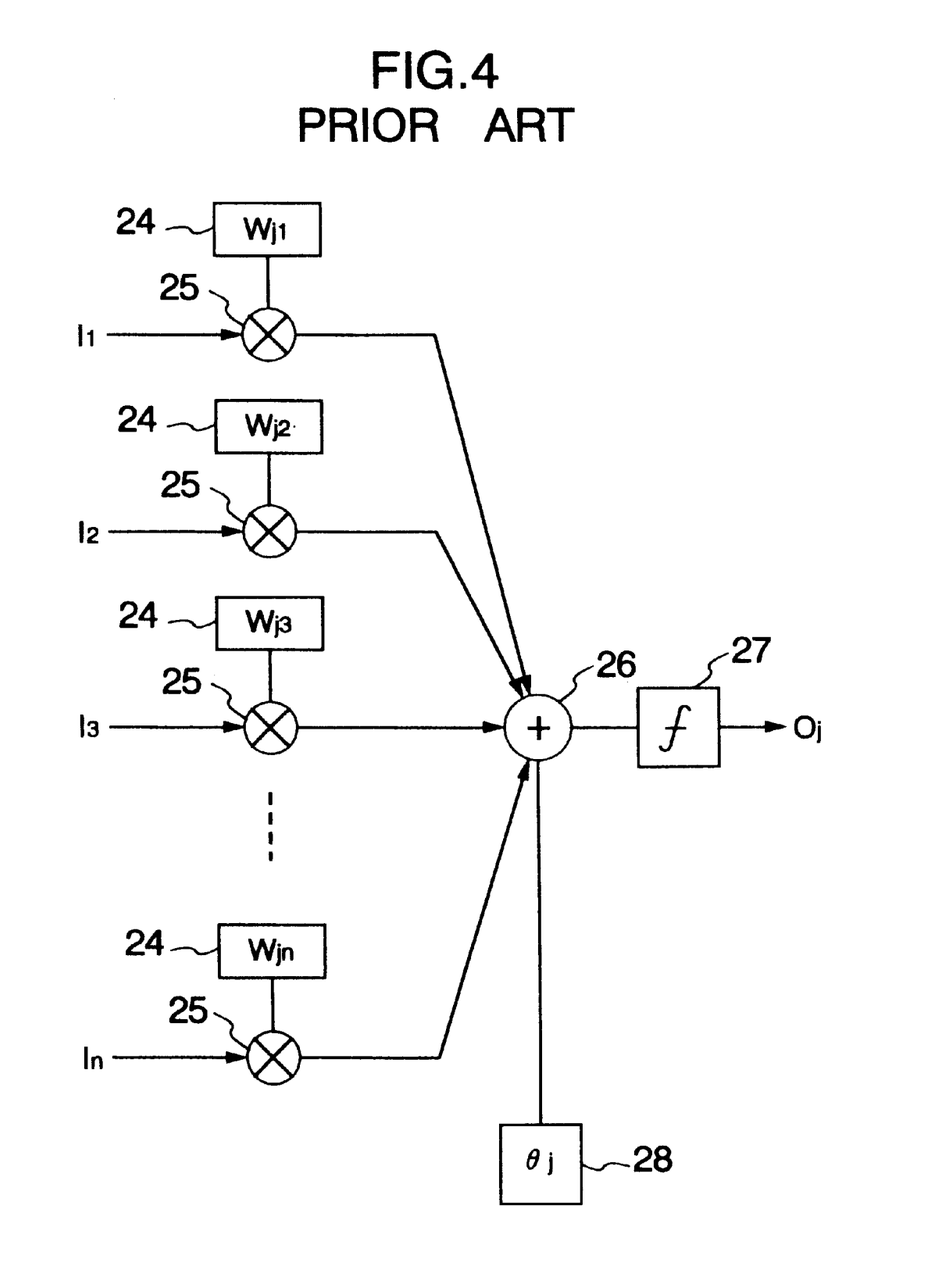
FIG. 4 is a diagram showing a circuit construction of FIG. 3.

FIG. 3 is an explanatory diagram showing the artificial neuron model 5 constructing the neural network 4. As shown in the diagram, the artificial neuron model (hereinafter, simply referred to as a "neuron model") 5 is a model of multi-inputs and one output which simulates the operation of a neuron of an organism. An output $O_j$ is determined by the sum of products of inputs $I_i$ ($I_l$ to $I_n$) and weight coefficients $W_{ji}$ ($W_{jl}$ to $W_{jn}$). Namely, the output $O_j$ is expressed as shown by the following equation (1) by using an input/output function f(x).

$$O_j = f\left(\sum_{i=1}^{n} (I_i \cdot W_{ji}) + \theta_j\right) \quad (1)$$

where, $\theta_j$: offset of the input/output function corresponding to a threshold value n: the number of inputs i: the number of the neuron model at the front stage j: the number of the neuron model at the post stage FIG. 4 shows an embodiment of an actual circuit of the neuron model of FIG. 3. Reference numeral 24 denotes registers in which the weight coefficients ($W_{j1}$, $W_{j2}$, ..., $W_{jn}$) have been stored. Reference numeral 25 denotes multipliers each for multiplying the input and the weight coefficient. Reference numeral 26 denotes an adder for adding outputs of the multipliers 25 and, further, the offset $\theta_j$. The offset $\theta_j$ has been stored in a register 28. Reference numeral 27 denotes a table memory in which a function for performing an input/output conversion, for example, a sigmoidal function or a linear function has been stored. An output of the adder 26 is inputted into the table memory and the data converted by the function stored is generated as an output $O_j$.

FIG. 2 mentioned above is an explanatory diagram showing a structure of the neural network 4 constructed as a network by coupling so as to have a layer structure. As shown in FIG. 2, the neural network 4 is constructed so as to realize functions of a signal processing and an information processing by constructing a network by using a number of neuron models 5 mentioned above and coupling them so as to have a layer structure of the input layer 21, hidden layer 22, and output layer 23. In FIG. 2, reference numeral 6 denotes branches for coupling the input layer 21 and hidden layer 22. Each neuron model 5 of the input layer 21 is coupled to all of the neuron models 5 of the hidden layer 22. Reference numeral 7 denotes branches for connecting the hidden layer 22 and output layer 23. Each neuron model 5 of the hidden layer 22 is coupled with all of the neuron models 5 of the output layer 23. The neural network 4 converts input information 8 which is supplied to the input layer 21 and generates as output information 9 from the output layer 23.

Only one input of each of the neuron models 5 of the input layer 21 is used and is connected to frame memories each for supplying the time sequential image data.

By constructing as mentioned above, the neural network 4 serves as an information processing mechanism having a learning function and a self systematizing function. The neural network 4 gives teach signals 10 and executes a learning, so that it is systematized by itself so as to generate desired output information 9 from the output layer for the input information 8 which is supplied to the input layer. In the input layer 21, an identity function as shown in the following equation (2) is used as an input/output function.

$$f_i(x) = x \quad (2)$$

Thus, the input is outputted as it is. It is also possible to modulate the input information 8 by using another function in place of the identity function.

Figure 5:
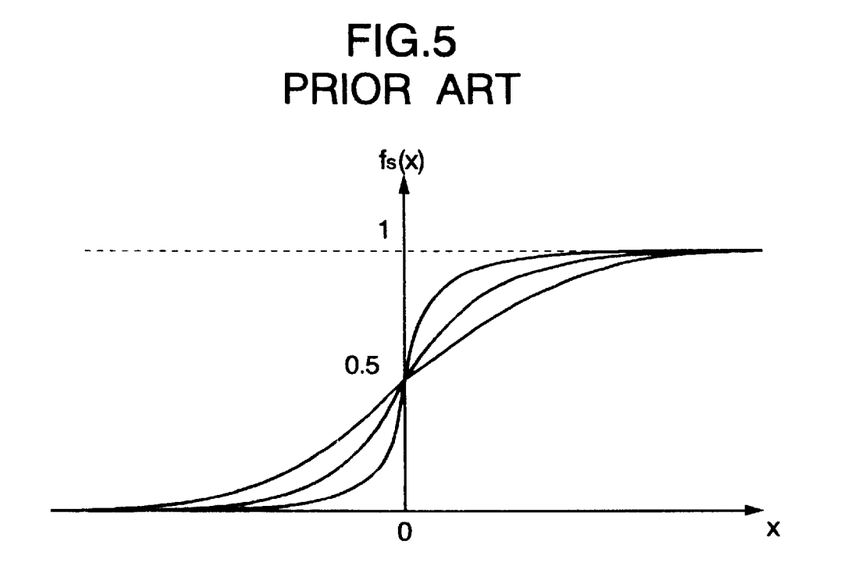
FIG. 5 is a diagram showing an example of an input/output conversion function which is used in a neural network.

FIG. 5 is a graph showing a sigmoidal function which is used as an input/output function of the hidden layer 22 of the neural network 4. In the hidden layer 22, a sigmoidal function in which an output $f_s$ monotonously increases within a range from "0" to "1" as shown in FIG. 5 is used as an input/output function. The sigmoidal function is expressed as shown in the following equation (3).

$$f_s(x) = \frac{1}{1 + \exp(-2x/U_0)} \quad (3)$$

where, $U_0$ denotes a parameter to control an inclination. By differentiating it, the following equation is obtained.

$$f_s'(x) = \frac{2}{U_0} \cdot f_s \cdot (1 - f_s)$$

This sigmoidal function has a feature such that it can be expressed by the original sigmoidal function. As mentioned above, by using a non-linear function such as a sigmoidal function or the like for the hidden layer 22, the neural network 4 can also handle a complicated non-linear converting process.

Figure 6:
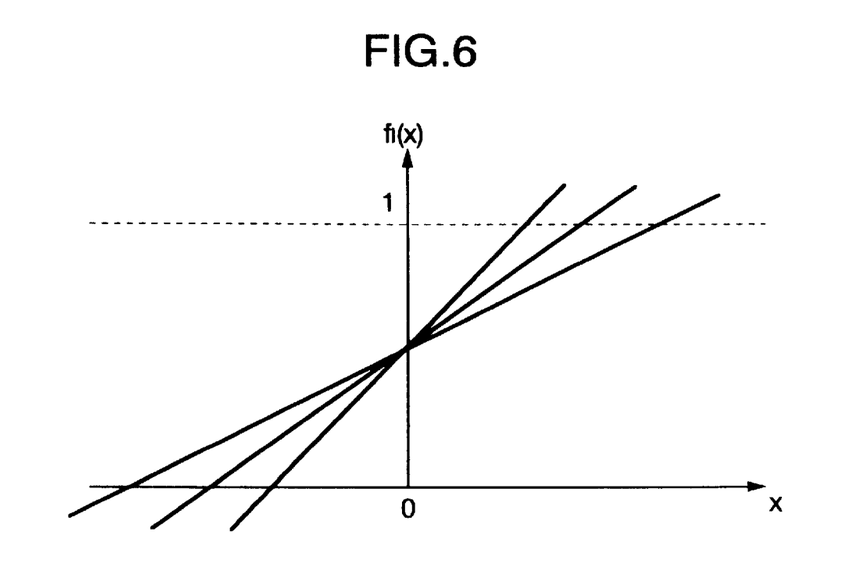
FIG. 6 is a diagram showing an example of an input/output conversion function which is used in a neural network of the invention.

Further, FIG. 6 is a graph showing a linear function which is used as an input/output function of the output layer 23 of the neural network 4. In the output layer 23, a linear function in which an output linearly increases or decreases for an input is used in place of the above sigmoidal function as an input/output function. Thus, the output from the output layer 23 has an analog-like value and an analog-like value such as dense/light information of an image or the like can be handled.

The operation of the image processing apparatus constructed as mentioned above will now be described. First, in FIG. 1, an information carrier is irradiated or inputted to an object from the original image supplying unit 1 and image data in which a change in information carrier was measured is outputted as a processing target. As such image data, it is possible to use data which was actually measured by an image diagnosing apparatus for a medical use, a video processing apparatus for a broad-casting use, an image processing apparatus for an industrial use, an image photographing displaying apparatus for a commercial use, or the like. It is also possible to use data obtained by reading out the data which had previously been measured with respect to an object and was written into the storing unit. The image data outputted from the original image supplying unit 1 is inputted to the neural network 4 as an image conversion processing unit 2.

Figure 7:
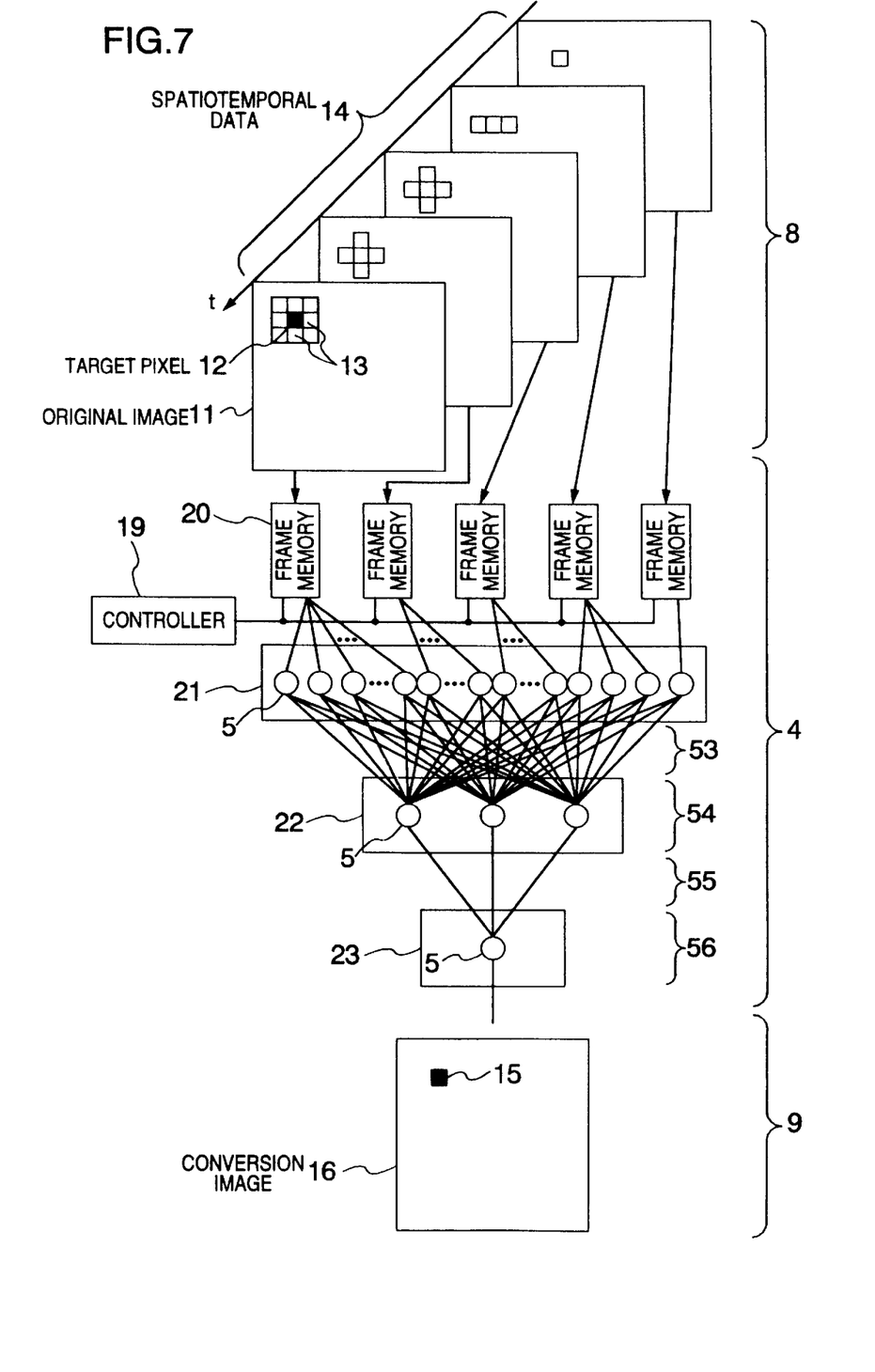
FIG. 7 is a diagram showing an image processing conversion in the neural network of the invention.

FIG. 7 is an explanatory diagram showing the input information 8 and output information 9 regarding a target pixel of the neural network 4. As shown in the diagram, a plurality of image data arranged on a time base is inputted to frame memories 20. The input information 8 to the neural network 4 is spatiotemporal data 14 obtained by extracting the data in a predetermined region including a target pixel 12 on an original image 11 and a plurality of pixels 13 near the target pixel 12 in the direction of a time base t only for a predetermined time by a controller 19. The predetermined region has an optional form for each frame. The pixel data of the optional form which are stored in the frame memory 20 are inputted into each of the neuron models 5 of the input layer 21. For example, when nine pixels are present, the pixel data are inputted into nine neuron models 5, when five pixels are present, the pixel data are inputted into five neuron models 5, and when three pixels are present, the pixel data are inputted into three neuron models 5, as shown in FIG. 7. In the example of FIG. 7, the spatiotemporal data 14 comprises data of 23 (=9+5+5+3+1) pixels. The values of the above pixels are, for example, normalized and inputted to the neural network 4. In the neural network 4, the weight coefficients and offset value of the neuron model are set by a learning operation, which will be explained hereinlater, in a manner such that in the case where the original image 11 accompanied with a motion and noise is inputted, noise in which a correlation is time spatially small and a motion which time spatially has a regularity can be distinguished. Therefore, in an operating mode, it is possible to cope with a moving image with low noise and without being accompanied with a blur by the motion. In the neural network 4, consequently, the image data as input information 8 is converted and is outputted as pixel data 15 corresponding to the target pixel 12 on the original image 11. By moving the target pixel 12 on the original image 11 in, for example, a raster scanning manner, the pixel data 15 corresponding to each target pixel 12 is sequentially outputted and the image converting process of the whole image is executed. A conversion image 16 is formed by the raster scanning-like image formation of the pixel data 15 which is sequentially outputted and is outputted.

In FIG. 7, reference numerals 53, 54, 55, and 56 denote step numbers in flowcharts, which will be explained hereinlater, and are shown in order to understand the operations. Two modes of an operating mode and a learning mode are provided for the neural network 4 of the invention. Prior to the actual image processes in the operating mode, the weight coefficients and offset of the neuron model are set to the optimum values in the learning mode. Namely, the weight coefficients of the branches 6 which couple the input layer and hidden layer and the branches 7 which couple the hidden layer and output layer are changed so as to reduce errors between the teach signals 10 serving as teachers and the output information 9 and the network is systematized by itself so as to obtain a desired output after the learning.

Figure 8:
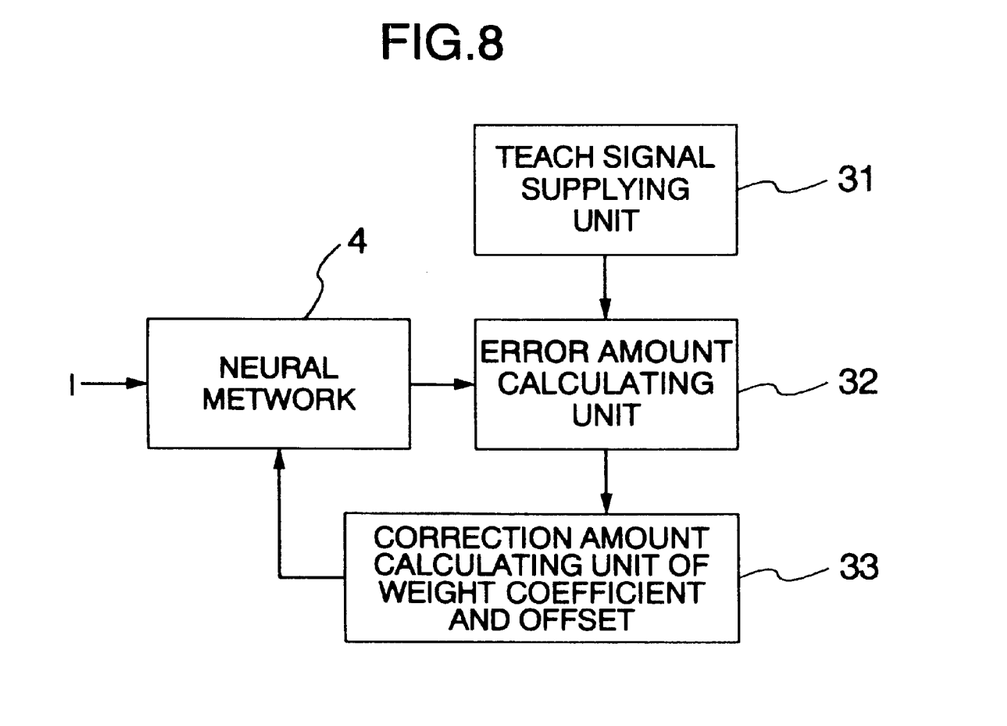
FIG. 8 is a diagram for explaining the learning operation of the neural network.

FIG. 8 is a diagram showing an embodiment of a system construction in the learning mode.

Reference numeral 31 denotes a teach image supplying unit of the teach signal 10; 32 an error amount calculating unit between the teach signal 10 and the output of the neural network 4; and 33 a correction amount calculating unit of the weight coefficients and offset of the neural network 4 on the basis of the calculated error amount.

Figure 9:
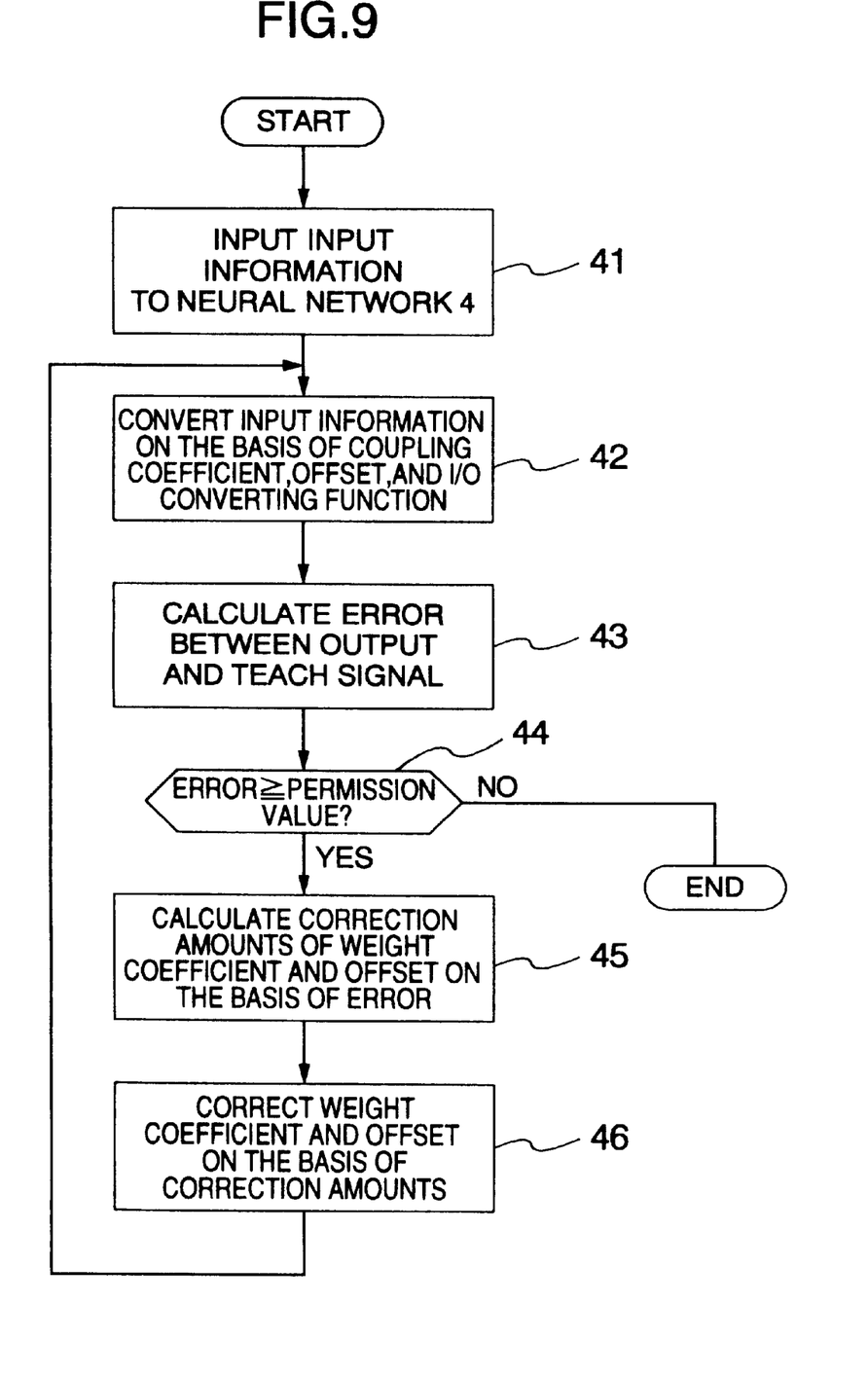
FIG. 9 is a flowchart for explaining the operation in FIG. 8.

FIG. 9 is a flowchart for the learning operation of the neural network 4 in the learning mode.

In step 41, input information I is inputted to the neural network 4.

In step 42, an input/output converting process is executed to the input information I on the basis of the weight coefficients and offset which were set into the neuron model and an input/output converting function.

In step 43, a difference between the output signal from the neural network 4 and the teach signal 10 inputted from the teach signal teach image supplying unit 31.

In step 44, a check is made to see if the difference is larger than a permission value. When the difference is smaller than the permission value, the processing routine is finished. When it is equal to or larger than the permission value, the processing routine advances to the next step.

In step 45, the correction amounts of the weight coefficients and offset of the neural network 4 are obtained on the basis of the difference obtained.

In step 46, the weight coefficients and offset of the neural network 4 are set to new values on the basis of the correction amounts obtained and the processing routine is returned to step 42.

Figure 10:
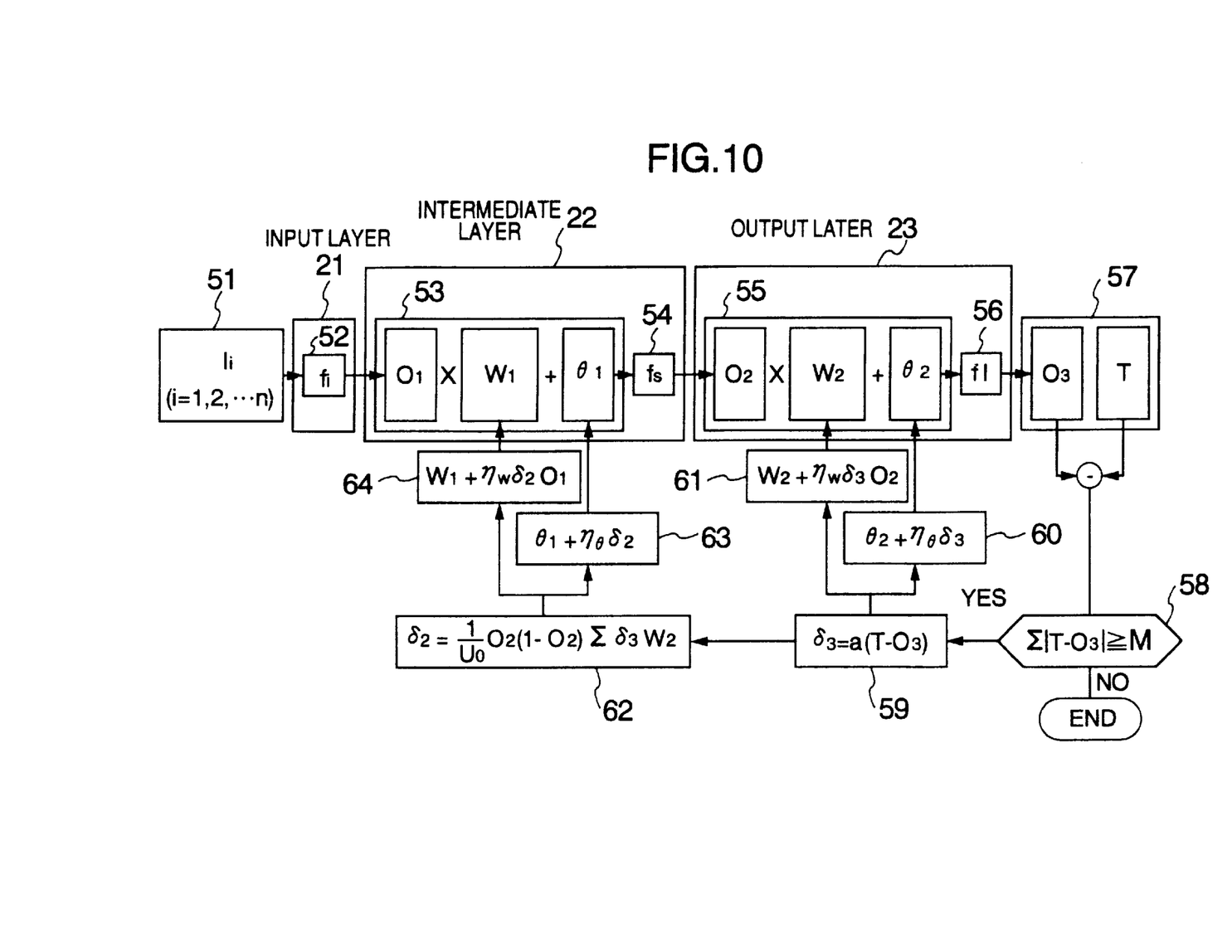
FIG. 10 is a detailed flowchart of FIG. 8.

FIG. 10 shows a detailed flowchart of FIG. 9.

In FIG. 10, reference characters have the following meanings.

$I_i$ (i=1, 2, . . . , n): input information $O_k$: output of a neuron model of the kth layer $W_k$: weight coefficient between the kth layer and the (k+1)th layer $\theta_k$: offset of the neuron model of the (k+1)th layer T: teach signal $\eta_w$: learning constant for the weight coefficient $\eta_\theta$: learning constant for the offset $\delta_k$: error amount to correct $W_{k-1}$ and $\theta k_{k-1}$ $f_i$: identity function $f_s$: sigmoidal function $f_l$: linear function The input information $I_i$, output $\theta_k$ of the neuron model of the kth layer, offset $\theta_k$ of the neuron model of the kth layer, teach signal T, and error amount $\delta_k$ to correct $W_{k-1}$ and $\theta_{k-1}$ are expressed by a 1-dimensional matrix. The weight coefficient $W_k$ between the kth layer and the (k+1)th layer is expressed by a 2-dimensional matrix. Since the neural network shown in the example is constructed by three layers, the first layer is the input layer 21, the second layer is the hidden layer 22, and the third layer is the output layer 23.

In step 51, the input information $I_i$ (i=1, 2, . . . , n) is inputted to the input layer 21 of the neural network 4.

In step 52, the input information $I_i$ is input/output converted by the identity function. Since the identity function is a function of [input=output], the input becomes the output as it is.

In step 53, a product and sum arithmetic operation of the equation (1) is executed in the hidden layer 22 by using an output $O_1$ of the input layer 21, a weight coefficient $W_1$ between the input layer 21 and the hidden layer 22, and an offset $\theta_1$ of the hidden layer 22.

In step 54, the result of the product and sum arithmetic operation in step 53 is subjected to the input/output conversion by the sigmoidal function $f_s$.

In step 55, the product and sum arithmetic operation of the equation (1) is executed in the output layer 23 by using an output $O_2$ of the hidden layer 22, a weight coefficient $W_2$ between the hidden layer 22 and the output layer 23, and an offset $\theta_2$ of the output layer 23.

In step 56, the result of the product and sum arithmetic operation in step 55 is input/output converted by a linear function $f_l$.

In step 57, a difference between an output $O_3$ of the output layer 23 and the teach signal T is obtained.

In step 58, the spatiotemporal data which is inputted in a lump is set to one pattern and a difference value $\Sigma|T-O_3|$ with respect to all of the patterns is compared with a permission value M. When the difference value is smaller than the permission value M, the processing routine is finished. When the difference value is equal to or larger than the permission value M, step 59 follows.

In step 59, an error amount $\delta_3$ serving as a reference to decide a correction amount of the weight coefficient $W_2$ between the hidden layer 22 and output layer 23 and a correction amount of the offset $\theta_2$ of the output layer 23 is obtained.

In step 60, a correction amount of the offset $\theta_2$ of the neuron model of the output layer 23 is obtained on the basis of the error amount $\delta_3$, thereby correcting the offset $\theta_2$ to $(\theta_2+\eta_\theta\delta_3)$.

In step 61, a correction amount of the weight coefficient $W_2$ between the hidden layer 22 and output layer 23 is obtained on the basis of the error amount $\delta_3$, thereby correcting the weight coefficient $W_2$ to $(W_2+\eta_w\delta_3O_2)$.

In step 62, an error amount $\delta_2$ serving as a reference to decide a correction amount of the weight coefficient $W_1$ between the input layer 21 and hidden layer 22 and a correction amount of the offset $\theta_1$ of the hidden layer 22 is obtained on the basis of the error amount $\delta_3$).

In step 63, a correction amount of the offset $\theta_1$ of the neuron model of the hidden layer 22 is obtained on the basis of the error amount $\delta_2$, thereby correcting the offset $\theta_1$ to $(\theta_1+\eta_\theta\delta_2)$.

In step 64, a correction amount of the weight coefficient $W_1$ between the input layer 21 and hidden layer 22 on the basis of the error amount $\delta_2$, thereby correcting the weight coefficient $W_1$ to $(W_1+\eta_w\delta_2O_1)$.

In the learning mode, until the difference value $\Sigma|T-O_3|$ is smaller than the permission value M in step 58, the correction of the weight coefficient and the offset is repeated. The values of the weight coefficient and offset when the difference value $\Sigma|T-O_3|$ is smaller than the permission value M are registered as learning values. In the executing mode, the input data is converted by the learning values and outputted.

Calculation examples of the error amounts $\delta_2$ and $\delta_3$ and the correction amounts are shown below.

A mean square error E between the teach signal T and the output $O_3$ of the output layer is $$E = \frac{1}{2}(T - O_3)^2$$

The weight coefficient $W_k$ between the kth layer and the (k+1)th layer is corrected by the following correction amount so as to reduce the mean square error E.

$$\Delta W_k = \eta_w \frac{\partial E}{\partial W_k}$$

$$= -\eta_w \frac{\partial E}{\partial X_{(k+1)}} \cdot \frac{\partial X_{(k+1)}}{\partial W_k}$$

[where, $X_{(k+1)}$ denotes an input of the (k+1)th layer to the input/output function of the neuron model.]

Now, assuming that $$\frac{\partial E}{\partial X_{(k+1)}} = -\delta_{(k+1)}$$

the error amount $\delta_3$ to decide the correction amount between the hidden layer and the output layer is $$\delta_2 = f'(X) \cdot \frac{\partial E}{\partial O_2}$$

$$= f'_s(X_3) \cdot (T - O_2)$$

$$= a(T - O_2)$$

(where, a denotes an inclination of the linear function $f_l$.)

Therefore, the correction amount is $$\Delta W_2 = -\eta_w \delta_3 O_2$$

Since a correcting expression is given as $(W_k-\Delta W_k)$, $W_2$ is corrected to $(W_2+\eta_w\delta_3O_2)$.

On the other hand, the error amount $\delta_2$ to decide the correction amount between the input layer and the hidden layer is $$\delta_2 = \frac{1}{U_0} O_2(1 - O_2) \sum \delta_3 W_2$$

The correction amount is $$\Delta W_1 = -\eta_w \delta_2 O_1$$

Therefore, $W_1$ after completion of the correction is changed to $(W_1+\eta_w\delta_2O_1)$ by calculating $(W_1-\Delta W_1)$.

A correction amount $\Delta\theta_k$ of the offset $\theta_k$ is obtained as follows.

$$\Delta\theta_k = -\eta_\theta \frac{\partial E}{\partial \theta_k}$$

$$= -\eta_\theta \frac{\partial E}{\partial X_{(k+1)}} \cdot \frac{\partial X_{(k+1)}}{\partial \theta_k}$$

Since $$\frac{\partial X_{(k+1)}}{\partial \theta_k} = 1, \Delta\theta_k = -\eta_\theta \delta_{(k+1)}$$

For example, $$\Delta\theta_2 = -\eta_\theta \delta_3$$

$$\Delta\theta_1 = -\eta_\theta \delta_2$$

By a correcting expression $(\theta_k-\Delta\theta_k)$, $\theta_2$ is corrected to $(\theta_2+\eta_\theta\delta_3)$ and $\theta_1$ is corrected to $(\theta_1+\eta_\theta\delta_2)$.

In the invention, the linear function is used as an input/output converting function of the output layer. Effects which are obtained by using the linear function will now be described.

In the conventional example, a non-linear function such as a sigmoidal function is used as an input/output converting function of the output layer of the neural network. Correction amounts of the weight coefficients in case of the sigmoidal function and in case of the linear function are obtained as shown in the following equations (4) and (5).

[correction amount in case of the sigmoidal function]

$$\Delta W_2 = -\eta_w \frac{1}{U_0} O_3(1 - O_3)(T - O_3) \cdot O_2 \quad (4)$$

[correction amount in case of the linear function]

$$\Delta W_2 = -\eta_w a(T-O_3)O_2 \quad (5)$$

When comparing the above equations, in the equation (4), when $O_3$, namely, the output of the output layer approaches 0 or 1, the correction amount $\Delta W_2$ approaches 0 and the correction is not performed. Therefore, as the output $O_3$ of the output layer becomes closer to 0 or 1, it is more difficult to be outputted and the learning at that time is not progressed as well.

That is, since the sigmoidal function is expressed as shown in FIG. 5, as an input x is away from 0, a region enters a saturation region and the output is set to a value near 0 or 1. Therefore, in this portion, the learning effect decreases.

On the other hand, in case of using the linear function, since "a" in the equation (5) is a constant, any output in a range from 0 to 1 of the output layer can be equivalently outputted and learned. It is possible to cope with an analog-like dense/light image having a meaning for all of the values within a range from 0 to 1.

In the case where the neural network has a layer structure of the first to jth layers (j≧3), the processes are similar to those in case of obtaining $\delta_3$. First, an error amount $\delta_j$ serving as a reference to decide a correction amount of a weight coefficient $W_{(j-1)}$ between the (j−1)th layer and jth layer and a correction amount of an offset $\theta_j$ of the jth layer is obtained. By using the error amount $\delta_j$, correction amounts of the weight coefficient $W_{(j-1)}$ and offset $\theta_j$ are obtained and, further, an error amount $\delta_{(j-1)}$ is obtained. In this case as well, $\delta_j$ corresponds to $\delta_3$ and $\delta_{(j-1)}$ corresponds to $\delta_2$.

In the image processing apparatus of the invention, the learning operation of the neural network 4 is executed on the algorithm as shown in FIG. 10 on the basis of the teach signals 10 which are given by the operator. Although the neural network 4 of three layers has been shown here as an example, by increasing the number of hidden layers, a neural network 4 of four or more layers can be constructed. As a learning algorithm in such a case, it is sufficient that the error amount $\delta$ is back propagated so as to obtain $\delta_2$ by using $\delta_3$ and a correction amount of each neuron model. It is possible to cope with image information including more complicated conversion. The image data converted by the neural network 4 is converted into a proper density scale (not shown) and is inputted to the display unit 3 shown in FIG. 1 and is displayed.

Figure 11:
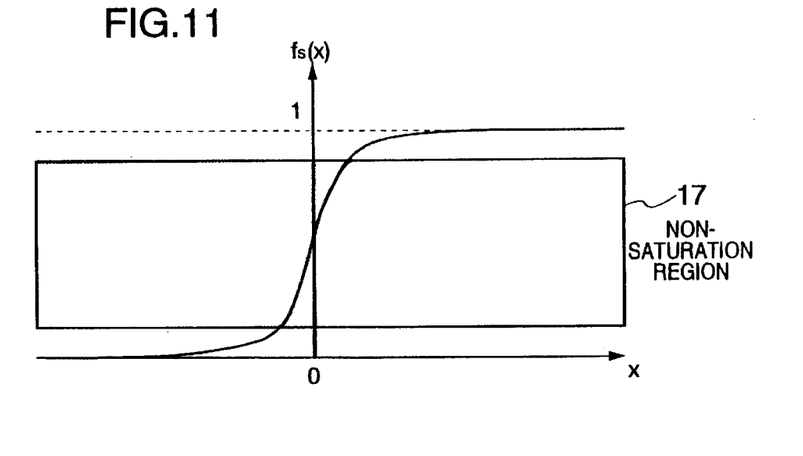
FIG. 11 is a diagram showing another embodiment of an input/output conversion function which is used in the invention.

FIG. 11 is a diagram for explaining another embodiment of the invention and shows a non-saturation region 17 of the sigmoidal function. According to another embodiment, the neural network 4 shown in FIG. 2 uses a function a part of which can be linearly approximated, for example, a non-saturation region 17 of the sigmoidal function shown in FIG. 5 as an input/output function of the output layer at the final stage of the network coupled so as to have a layer structure by limiting such the non-saturation region 17 as an output range of the image information. In this case as well, the image information can be outputted by an analog value in a manner similar to that mentioned above.

Figure 12A:
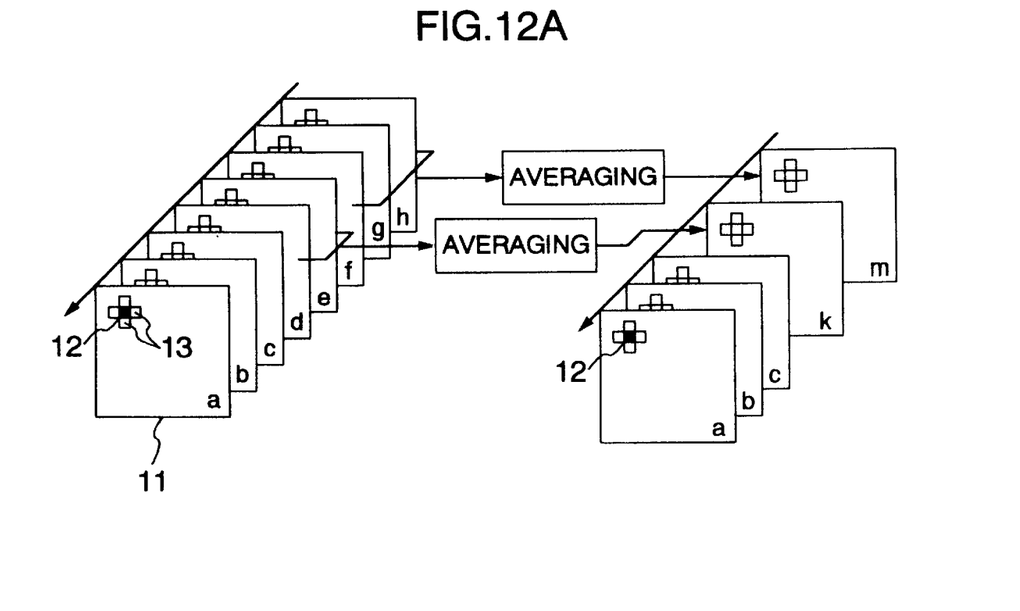
FIG. 12A is a diagram for explaining an image compression at a time base.
Figure 12B:
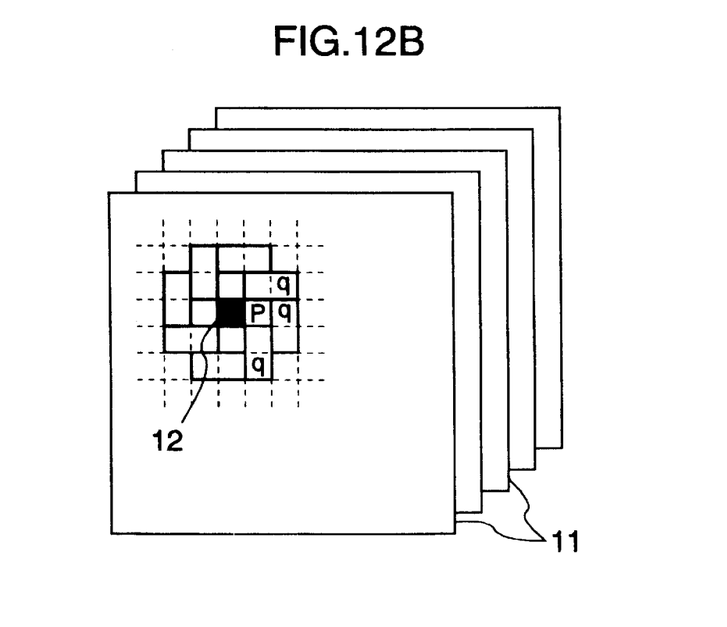
FIG. 12B is a diagram for explaining an image compression in a spatial base.

FIGS. 12A and 12B are diagrams for explaining another embodiment of the invention and shows a compression of image data which is inputted to the neural network 4. According to the embodiment, as for the image data which is inputted to the neural network 4, the number of pixels is increased as the pixel position is time spatially away from the target pixel 12 and the image data is averaged, thereby compressing the input information to the neural network 4. Namely, as shown in FIG. 12A, in the compression in the direction of the time base t with respect to the original image 11, the number of pixels is increased as the pixel position is away from the time frame including the target pixel 12, thereby averaging the image data. Namely, the number of images to be averaged is increased as the image position is away from a target image a in a manner such that images (d, e) are averaged to an image k and images (f, g, h) are averaged to an image m.

As shown in FIG. 12B, with respect to the compression in the spatial direction in the original image 11, the number of pixels is increased as the pixel position is away from the target pixel 12, thereby averaging the image data. Namely, although the image data of a pixel p adjacent to the target pixel 12 is held as it is, in a portion q which is in contact with the pixel p, the image data of two pixels is averaged. By the above averaging processes, the number of data which is inputted to the neural network 4 is reduced and the complicated image converting processes each of which needs a long time or a wide region can be executed at a high speed.

Figure 13:
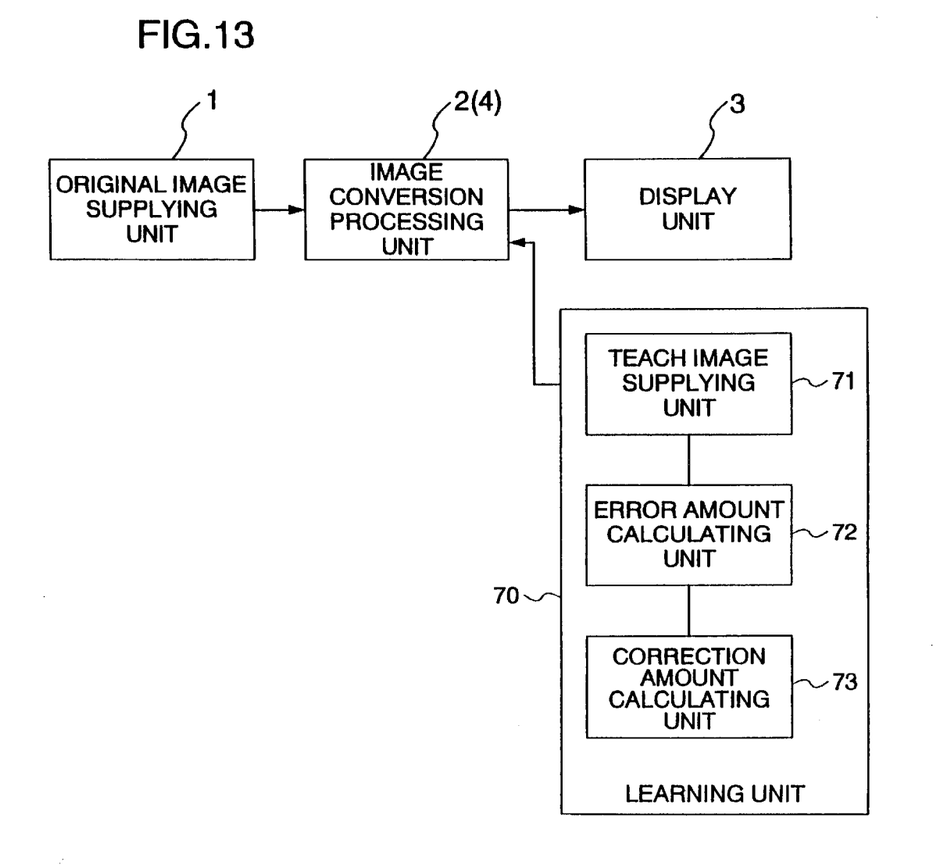
FIG. 13 is a block constructional diagram showing another embodiment of an image processing apparatus of the invention.

FIG. 13 is a block diagram showing the fourth embodiment of the invention. According to the embodiment, a learning unit 70 for allowing the neural network 4 serving as an image conversion processing unit 2 shown in FIG. 1 to execute the learning operation can be connected by the user to the neural network 4 from the outside. The learning unit 70 includes: a teach image supplying unit 71; an error amount calculating unit 72 to obtain the error amount $\delta$ from a difference between the teach signal and the output of the neural network 4; and a correction amount calculating unit 73 to obtain correction amounts of the weight coefficient and offset from the error amount $\delta$.

In the embodiment shown in FIG. 1, at the time of the shipping from a factory or the installation to facility that is used or the like, a desired learning operation is previously executed by giving the average or standard or specific teach signal 10. However, since there is a case where the learning operation doesn't match with a use situation of each user or the like at the actual use location, the fourth embodiment intends to improve such a drawback. That is, in FIG. 13, the teach image supplying unit 71 is a measuring apparatus for measuring or photographing an object or a memory apparatus in which image data obtained by measuring an object is stored and from which the image data is read out as necessary. The learning unit 70 is connected to an output end to which the output information 9 is outputted from the output layer (refer to FIG. 2) of the neural network 4. Each user or the like supplies a teach image any time, as a teach signal 10, which is considered to be ideal for the image data that is outputted from the original image supplying unit 1, thereby allowing the neural network 4 to execute the learning operation.

The operation such that the teach image is supplied as teach signal 10 from the teach image supplying unit 71 and the neural network 4 learns will now be described. In case of eliminating the peculiar noise or character which the apparatus system has, the image data including the noise or character derived from the original image supplying unit 1 by the target apparatus system is supplied to the neural network 4 as an image conversion processing unit 2. The image data which is obtained from the teach image supplying unit 71 by the ideal apparatus system and doesn't include the noise or character is supplied to the neural network 4 and the learning operation is executed by the algorithm shown in FIG. 10 mentioned above. Upon learning, the noise or character is detected as $\Sigma|T-O_3|$ in FIG. 10. A conversion model to the ideal apparatus system which doesn't include the noise or character has automatically been constructed from the target apparatus system including the noise or character for the neural network 4 after completion of the learning. In the operating mode, the noise or character can be effectively eliminated with respect to the inputted original image.

For example, a case where an X-ray photographing apparatus for photographing by X-rays of a low dose is set to a target system will now be described. An X-ray image photographed by the X-rays of a low dose is supplied from the original image supplying unit 1 to the neural network 4. An X-ray image with small X-ray quantum noise which was photographed by X-rays of a high dose or an X-ray image obtained by averaging a plurality of X-ray images of a low dose on a pixel unit basis is supplied from the teach image supplying unit 71 to the neural network 4. Thus, the neural network 4 detects an X-ray quantum noise component as $\Sigma|T-O_3|$ in FIG. 10 and executes the learning operation so as to reduce the X-ray quantum noise. A conversion model from the X-ray image of a low dose to the X-ray image of a high dose is automatically constructed in the neural network 4 after completion of the learning. That is, the image converting process in which the X-ray quantum noise are reduced is realized. Even in the case where the X-ray image of a low dose is inputted, the same X-ray image as that obtained as if it was photographed by X-rays of a high dose is outputted.

A case of eliminating noise of an X-ray image in association with a motion will now be described as another example. The X-ray image of a low dose accompanied with the motion is supplied from the original image supplying unit 1 to the neural network 4. The X-ray image of a high dose accompanied with the motion is supplied from the teach image supplying unit 71 to the neural network 4. The neural network 4 detects the noise component of the X-ray image accompanied with the motion as $\Sigma|T-O_3|$ in FIG. 10 and performs the learning operation so as to reduce the noise component. A conversion model in which the noise are reduced without being accompanied with a blur due to a motion is automatically constructed in the neural network 4 after completion of the learning. An image in which the noise are reduced without being accompanied with a blur due to the motion is outputted.

As further another example, an image that is matched with a taste of the user or an image in which a region which the user wants to see, namely, a concerned region can be easily seen is supplied from the teach image supplying unit 71 to the neural network 4 and the neural network 4 is allowed to execute the learning operation, so that an image which is preferably matched with a taste of the user or an image in which the concerned region can be easily seen can be outputted.

According to the invention as mentioned above, the image data which is inputted by a target problem and the image data serving as a teacher are properly supplied from the original image supplying unit 1 and teach image supplying unit 71 to the neural network 4 and the neural network 4 is allowed to execute the learning operation, so that its conversion model is automatically constructed in the neural network 4. An accurate image having a large transfer information amount can be provided.

The invention is not limited to the foregoing embodiments but incorporates many various modifications within the spirit and scope of the appended claims of the invention.

What is claimed is:

1. An image processing apparatus comprising:
   an original image supplying unit for outputting image data of a processing target;
   an image conversion processing unit for receiving the image data from said original image supplying unit and executing an image converting process; and
   a display unit for receiving image information processed by said image conversion processing unit and displaying;
   wherein said original image supplying unit includes means for outputting spatiotemporal data of a predetermined region including a target pixel of an image, the spatiotemporal data including first spatial data, acquired at a first time, in which the predetermined region has a first size, and second spatial data, acquired at a second time prior to the first time, in which the predetermined region has a second size smaller than the first size; and
   wherein said image conversion processing unit includes
   a neural network formed by mutually connecting a plurality of artificial neuron models so as to have a layer structure of at least an input layer, a hidden layer, and an output layer, and
   converting means for outputting data corresponding to said target pixel from said output layer on a basis of said inputted spatiotemporal data.

2. An image processing apparatus according to claim 1, wherein said original image supplying unit includes means for averaging a number of pixels as a pixel position is away from the target pixel with respect to a time and outputting.

3. An image processing apparatus according to claim 1, wherein said original image supplying unit includes means for averaging a number of pixels as a pixel position is spatially away from the target pixel and outputting.

4. An image processing apparatus according to claim 1, further comprising:
   means for supplying a teach image for allowing said neural network to execute a learning operation;
   means for detecting a difference between an output signal from said output layer and a teach signal from said means for supplying said teach image; and
   means for correcting a weight coefficient and an offset of said neural network on the basis of said detected difference so as to reduce said difference.

5. An image processing apparatus according to claim 4, wherein said means for detecting said difference includes means for obtaining said differences with respect to all of the pixels of an output image.

6. An image processing apparatus comprising:
   an original image supplying unit for outputting image data of a processing target;
   an image conversion processing unit for receiving the image data from said original image supplying unit and executing an image converting process; and
   a display unit for receiving image information processed by said image conversion processing unit and displaying;
   wherein said original image supplying unit includes means for outputting spatiotemporal data of a predetermined region including a target pixel of an image, the spatiotemporal data including first spatial data, acquired at a first time, in which the predetermined region has a first size, and second spatial data, acquired at a second time prior to the first time, in which the predetermined region has a second size different than the first size;
   wherein said image conversion processing unit includes
   a plurality of memory units for storing each of the first spatial data and the second spatial data,
   converting means for outputting information corresponding to said target pixel on a basis of the first spatial data and the second spatial data, and
   a memory controller for controlling said memory units to input the first spatial data and the second spatial data stored in said memory units into said converting means; and
   wherein said display unit displays said information corresponding to said target pixel outputted by said converting means.

7. An image processing apparatus according to claim 6, wherein the first spatial data and the second spatial data are respectively stored in corresponding ones of said memory units;
   wherein said memory controller controls said memory units to independently input each of the first spatial data and the second spatial data stored in said memory units into said converting means;
   wherein said information corresponding to said target pixel outputted by said converting means includes data of said target pixel; and
   wherein said display unit displays said data of said target pixel.

8. An image processing apparatus according to claim 6, wherein said converting unit has stored therein a linear function for use in performing an input/output converting operation in producing said information corresponding to said target pixel.

9. An image processing apparatus according to claim 6, wherein said converting unit has stored therein a non-linear function, a part of which can be linearly approximated, for use in performing an input/output converting operation in producing said information corresponding to said target pixel; and wherein said image conversion processing unit further includes means for limiting said part that can be linearly approximated to an input/output converting region for producing said information corresponding to said target pixel.

10. An image processing apparatus comprising:

an original image supplying unit for outputting image data of a processing target;

an image conversion processing unit for receiving the image data from said original image supplying unit and executing an image converting process; and a display unit for receiving image information processed by said image conversion processing unit and displaying;

wherein said original image supplying unit includes means for outputting spatiotemporal data of a predetermined region including a target pixel of an image;

wherein said image conversion processing unit includes a neural network formed by mutually connecting a plurality of artificial neuron models so as to have a layer structure of at least an input layer, a hidden layer, and an output layer, and converting means for outputting data corresponding to said target pixel from said output layer on a basis of said inputted spatiotemporal data;

wherein said image processing apparatus further comprises:

means for supplying a teach image for allowing said neural network to execute a learning operation;

means for detecting a difference between an output signal from said output layer and a teach signal from said means for supplying said teach image; and means for correcting a weight coefficient and an offset of said neural network on the basis of said detected difference so as to reduce said difference; and wherein in the case where said neural network has a plurality of layers in a range from the first layer to the jth layer (j is an integer of 3 or more), said correcting means includes:

means for obtaining an error amount $\delta_j$ serving as a reference to decide a correction amount of a weight coefficient between the (j−1)th layer and the jth layer and a correction amount of an offset of the jth layer from said difference detected;

means for obtaining a correction amount of said weight coefficient between the (j−1)th layer and the jth layer and a correction amount of said offset of the jth layer from said error amount $\delta_j$;

means for obtaining an error amount $\delta_{(j-1)}$ serving as a reference to decide a correction amount of a weight coefficient between the (j−2)th layer and the (j−1)th layer and a correction amount of an offset of the (j−1)th layer from said error amount $\delta_j$; and means for obtaining a correction amount of said weight coefficient between the (j−2)th layer and the (j−1)th layer and a correction amount of said offset of the (j−1)th layer from said error amount $\delta_{(j-1)}$.

11. An image processing method using a neural network comprising the steps of:

inputting spatiotemporal data of a predetermined region including a target pixel of an image to a neural network formed by mutually connecting a plurality of artificial neuron models so as to have a layer structure of at least an input layer, a hidden layer, and an output layer, the spatiotemporal data including first spatial data, acquired at a first time, in which the predetermined region has a first size, and second spatial data, acquired at a second time prior to the first time, in which the predetermined region has a second size smaller than the first size; and executing a converting process to said inputted spatiotemporal data by a weight coefficient and an offset of said neural network and an input/output converting function and outputting data corresponding to said target pixel from said output layer.

12. An image processing method according to claim 11, wherein the step of inputting said spatiotemporal data includes the step of averaging a number of pixels as a pixel position is away from a target pixel with respect to a time and inputting.

13. An image processing method according to claim 11, wherein the step of inputting said spatiotemporal data includes the step of averaging a number of pixels as a pixel position is spatially away from a target pixel and inputting.

14. An image processing method according to claim 11, further comprising the steps of:

supplying a teach signal for allowing said neural network to execute a learning operation to an output unit of said output layer;

detecting a difference between an output signal from said output layer and said teach signal; and correcting said weight coefficient and said offset on the basis of said difference.

15. An image processing method according to claim 14, wherein the step of detecting said difference includes the step of obtaining said differences with respect to all of pixels of an output image.

16. An image processing method using a neural network comprising the steps of:

inputting spatiotemporal data of a predetermined region including a target pixel of an image to a neural network formed by mutually connecting a plurality of artificial neuron models so as to have a layer structure of at least an input layer, a hidden layer, and an output layer;

executing a converting process to said inputted spatiotemporal data by a weight coefficient and an offset of said neural network and an input/output converting function and outputting data corresponding to said target pixel from said output layer;

supplying a teach signal for allowing said neural network to execute a learning operation to an output unit of said output layer;

detecting a difference between an output signal from said output layer and said teach signal; and correcting said weight coefficient and said offset on the basis of said difference;

wherein in the case where said neural network has a plurality of layers in a range from the first layer to the jth layer (j is an integer of 3 or more), said correcting step includes the steps of:

obtaining an error amount $\delta_j$ serving as a reference to decide a correction amount of a weight coefficient between the (j−1)th layer and the jth layer and a correction amount of an offset of the jth layer from said difference detected;

obtaining a correction amount of said weight coefficient between the (j−1)th layer and the jth layer and a correction amount of said offset of the jth layer from the error amount $\delta_j$;

obtaining an error amount $\delta_{(j-1)}$ serving as a reference to decide a correction amount of a weight coefficient between the (j−2)th layer and the (j−1)th layer and a correction amount of an offset of the (j−1)th layer from said error amount $\delta_j$; and obtaining a correction amount of said weight coefficient between the (j−2)th layer and the (j−1)th layer and a correction amount of said offset of the (j−1)th layer from said error amount $\delta_{(j-1)}$.

17. An image processing method using a neural network comprising the steps of:

inputting spatiotemporal data of a predetermined region including a target pixel of an image to a neural network formed by mutually connecting a plurality of artificial neuron models so as to have a layer structure of at least an input layer, a hidden layer, and an output layer, the spatiotemporal data including first spatial data, acquired at a first time, in which the predetermined region has a first size, and second spatial data, acquired at a second time prior to the first time, in which the predetermined region has a second size different than the first size;

executing a converting process to said inputted spatiotemporal data by a weight coefficient and an offset of said neural network and an input/output converting function and outputting data corresponding to said target pixel from said output layer;

supplying a teach signal for allowing said neural network to execute a learning operation to an output unit of said output layer;

detecting a difference between an output signal from said output layer and said teach signal; and correcting said weight coefficient and said offset on the basis of said difference.

18. An image processing method according to claim 17, wherein said data corresponding to said target pixel outputted from said output layer includes data of said target pixel.

19. An image processing method according to claim 17, wherein the step of executing said converting process includes the step of performing an input/output converting process by a linear function in said output layer.

20. An image processing method according to claim 17, wherein the step of executing said converting process includes the step of performing an input/output converting process by a region which can be linearly approximated of a non-linear function, a part of which can be linearly approximated, in said output layer.

21. An image processing method according to claim 17, wherein the step of inputting spatiotemporal data includes the step of inputting the first spatial data and the second spatial data in parallel to the input layer of the neural network.

* * * * *